United States Patent
Stropp et al.

(10) Patent No.: US 7,491,419 B2
(45) Date of Patent: Feb. 17, 2009

(54) PROCESS FOR VEHICLE REPAIR COATING

(75) Inventors: Juergen Peter Stropp, Wuppertal (DE); Martin Wulf, Langenfeld (DE); Helmut Loeffler, Hennef (DE); Dmitry Chernyshov, Wuppertal (DE)

(73) Assignee: EI du Pont de Nemours & Company, Wilmington, DE (US)

(*) Notice: Subject to any disclaimer, the term of this patent is extended or adjusted under 35 U.S.C. 154(b) by 478 days.

(21) Appl. No.: 11/329,428

(22) Filed: Jan. 11, 2006

(65) Prior Publication Data

US 2006/0165882 A1 Jul. 27, 2006

Related U.S. Application Data

(60) Provisional application No. 60/647,058, filed on Jan. 26, 2005.

(51) Int. Cl.
*B05D 3/06* (2006.01)
*B05D 7/16* (2006.01)

(52) U.S. Cl. ............... 427/140; 427/508; 427/553

(58) Field of Classification Search .......... 427/140, 427/508, 553
See application file for complete search history.

(56) References Cited

U.S. PATENT DOCUMENTS

| | | | |
|---|---|---|---|
| 3,179,530 | A | 4/1965 | Erikson et al. |
| 3,789,037 | A | 1/1974 | Miller et al. |
| 4,442,256 | A | 4/1984 | Miller |
| 5,212,210 | A | 5/1993 | Halm |
| 5,473,032 | A | 12/1995 | Bederke et al. |
| 5,691,417 | A | 11/1997 | Bremer et al. |
| 6,552,140 | B1 | 4/2003 | Kneafsey et al. |
| 2005/0124714 | A1* | 6/2005 | Weikard et al. .......... 522/35 |

FOREIGN PATENT DOCUMENTS

| | | |
|---|---|---|
| EP | 0428124 A1 | 5/1991 |
| EP | 0867457 A1 | 9/1998 |
| EP | 1227895 B1 | 8/2002 |
| WO | WO 0017241 A1 | 3/2000 |
| WO | WO 0124946 A2 | 4/2001 |

OTHER PUBLICATIONS

ICNRP Guidelines "Guidelines on Limits of Exposure to Ultraviolet . . . Radiation)", Health Physics, Aug. 2004, vol. 87, No. 2, pp. 171-186.
Copending U.S. Appl. No. 60/647,217, filed Jan. 26, 2005.
Search Report for International Appln. No. PCT/US2006/003000.

* cited by examiner

*Primary Examiner*—William Phillip Fletcher, III
(74) *Attorney, Agent, or Firm*—Sudhir G. Deshmukh

(57) ABSTRACT

A process for repairing a vehicle coating, comprising the following steps:
I) applying a UV radiation coating composition onto a coated vehicle or vehicle part, having a blemished area on the coated surface to be repaired, wherein the coating composition comprises
  A) at least one free-radically polymerizable oligomeric and/or polymeric binder containing olefinically unsaturated groups,
  B) optionally, at least one free-radically polymerizable monomeric reactive diluent containing one or more olefinically unsaturated groups,
  C) at least one photoinitiator,
  D) at least one metal compound of a metal salt containing the metal in the cation and/or anion of the compound, organometallic compounds, metal coordination compounds and mixtures thereof, wherein the metal is from groups 13-14 of the periodic system of elements and a transition metal, and is able to occur in at least 2 oxidation states other than zero and
  E) optionally, water, organic solvents, pigments, fillers and/or conventional coating additives, and
II) irradiating the resultant coating with UV radiation.

16 Claims, No Drawings

PROCESS FOR VEHICLE REPAIR COATING

CROSS-REFERENCE TO RELATED APPLICATION

This application claims the benefit of U.S. Provisional Application Ser. No. 60/647,058 filed on Jan. 26, 2005 which is hereby incorporated by references in its entirety.

BACKGROUND OF THE INVENTION

The invention relates to a process for vehicle repair coating with coating compositions curable by UV (ultraviolet) radiation based on free-radically polymerizable binders, which process gives rise to fully cured coatings with satisfactory technological properties after UV irradiation.

DESCRIPTION OF THE PRIOR ART

It is known in the field of vehicle repair coating, e.g., in a body shop, that the various coating layers of a multilayer structure, such as, for example, the filler, base coat, clear coat and/or one-layer top coat layer, may be cured extremely rapidly by means of UV radiation if appropriate binders are used, e.g., free-radically polymerizable binders. But almost all radiation-curable binder systems based on the formation of free radicals exhibit the disadvantage of inhibition of the polymerization reaction by atmospheric oxygen, as a result of which the surface of an applied film is not completely cured and exhibits, for example, inadequate hardness and scratch resistance. The inhibition is caused by the competitive reactions, which occur during free-radical polymerization in the presence of atmospheric oxygen, wherein the oxygen reacts with the free radicals arising at the surface and the latter are no longer available in their entirety for the polymerization reaction.

Various methods have already been developed for avoiding or reducing oxygen inhibition. One possibility is to use chemically modified resins, for example, in the case of unsaturated polyester resins, the inhibition effect may be overcome by incorporation of allyl ether groups. Trimethylolpropane diallyl ether may, for example, be used for this purpose. Another possibility, in principle, is to work in an inert gas atmosphere with exclusion of oxygen. Nitrogen or a carbon dioxide/nitrogen mixture is conventionally used for this purpose. It is also known to avoid oxygen inhibition by adding paraffins or similar waxy substances which form a protective film on the surface.

While the stated approaches do indeed in principle solve or minimize the problem of inhibition by atmospheric oxygen, they also cause additional difficulties with regard to process control or achieving certain technological properties of the coatings, in particular in the field of vehicle repair coating which usually is done in body shops.

EP 428124 describes solvent-based pigmented coatings which crosslink by means of a "UV redox system" (in this case a combination of an organic acid metal salt and a peroxide) and contain physically drying polymers, resins with ethylenically unsaturated groups, photoinitiators and metal salts of organic acids.

Application proceeds by initially applying an organic solution of a physically drying resin, for example, nitrocellulose, and a peroxide and heating the coating and then applying the above-stated coating composition and irradiating with UV radiation. The intention is in this manner to obtain coatings with a relief effect and good adhesion to the substrate.

WO 00/17241 describes polymerizable compositions activatable by atmospheric oxygen for use in the electrical industry, which contain free-radically polymerizable monomers, an activator system consisting of a beta-diketone, a transition metal salt and a weak acid. The compositions contain no peroxides or any other substances capable of forming free radicals in the absence of atmospheric oxygen. Apart from the crosslinking mechanism based on autoxidation by atmospheric oxygen, the composition may also comprise further crosslinking mechanisms, for example, curing by means of UV radiation or heat. In any event, the presence of the beta-diketone should bring about rapid, tack-free curing. Beta-diketones are stable in air, but exert their autoxidative action in the presence of a weak acid and a transition metal salt.

The above-stated prior art documents contain neither any mention of the problem of inhibition of free-radical polymerization by atmospheric oxygen in UV curing, nor any possible solution to this problem.

There is accordingly a requirement for a suitable process in vehicle repair coating, in particular in a body shop, which makes it possible to apply coating compositions curable by means of UV radiation based on free-radically polymerizable binders, which yield fully cured films with acceptable technological properties without using elaborate methods, such as, for example, working under an inert atmosphere.

SUMMARY OF THE INVENTION

The present invention relates to a process for the production of a vehicle repair coating, comprising the following steps:

I) applying a coating composition curable by means of UV radiation onto a vehicle or vehicle part, said vehicle or vehicle part having a blemished area to be repaired on the coated surface, whereas the coating composition comprises A) at least one free-radically polymerizable oligomeric and/or polymeric binder containing olefinically unsaturated groups, B) optionally, at least one free-radically polymerizable monomeric reactive diluent containing one or more olefinically unsaturated groups, C) at least one photoinitiator for free-radical polymerization, D) at least one metal compound selected from the group consisting of metal salt compounds containing the metal in the cation and/or anion of the compound, organometallic compounds, metal coordination compounds and mixtures thereof, wherein the metal or the metals are selected from the group consisting of a metal from groups 13-14 of the periodic system of elements and a transition metal, which metal or transition metal is able to occur in at least 2 oxidation states other than zero and E) optionally, water, organic solvents, pigments, fillers and/or conventional coating additives, and II) irradiating the resultant coating with UV radiation.

DETAILED DESCRIPTION OF THE INVENTION

It has surprisingly been found that the process of the present invention using the above-stated UV curable coating compositions provides coatings with fully cured films when curing proceeds under UV radiation in a normal air atmosphere. The process of the present invention using the above stated coating compositions prove particularly advantageous if curing proceeds substantially by irradiation with UV-A radiation (described hereinafter), where the disruptive influence of atmospheric oxygen on free-radical polymerization is normally particularly evident and gives rise to unacceptable film surfaces. Furthermore the process of the present invention allows using UV radiation of lower intensity without taking disadvantages in film surface properties.

The individual steps of the process according to the invention as well as the constituents of the UV curable coating compositions used in that process will be described in greater detail below.

The term (meth)acrylic as used here and hereinafter should be taken to mean methacrylic and/or acrylic.

All molecular weights (both number and weight average molecular weight) referred to herein are determined by GPC (gel permeation chromatography) using polystyrene as the standard, unless otherwise stated.

In step I a coating composition curable by means of UV radiation is applied onto a coated vehicle or vehicle part, said vehicle or vehicle part having a blemished area on the coated surface. The coating composition curable by means of UV radiation is applied to repair the blemished area on the coated surface. A blemished area shall include damages to the lacquer finish, those due to an accident or a similar damage was caused as well as smaller damages as scratches or dust and dirt inclusions, as they can occur within the coating process, e.g., with the car manufacturer.

The UV curable coating composition comprises components A) to E). Component A) comprises free-radically polymerizable oligomeric and/or polymeric binders containing olefinically unsaturated groups.

Suitable binders having free-radically polymerizable olefinic double bonds that may be considered are, for example, all the binders known to the skilled person that can be crosslinked by free-radical polymerization. These binders are prepolymers, such as, polymers and oligomers containing, per molecule, one or more, preferably on average 2 to 20, particularly preferably 3 to 10 free-radically polymerizable olefinic double bonds. The polymerizable double bonds may, for example, be present in the form of (meth)acryloyl, vinyl, maleate and/or fumarate groups. The free-radically polymerizable double bonds are particularly preferably present in the form of (meth)acryloyl groups.

Examples of prepolymers or oligomers include (meth)acryloyl-functional poly(meth)acrylates, polyurethane (meth)acrylates, polyester (meth)acrylates, unsaturated polyesters, polyether (meth)acrylates, silicone (meth)acrylates, epoxy (meth)acrylates, amino (meth)acrylates and melamine (meth)acrylates. The number average molar weight Mn of these compounds may be, for example, 500 to 10,000 g/mole, preferably 500 to 5,000 g/mole. The binders may be used individually or as a mixture.

The prepolymers may be used in combination with reactive diluents having one or more unsaturated free-radically polymerizable groups (component B).

Reactive diluent is the shorthand term for the longer name according to DIN 55945: 1996-09, which defines such substances as diluents, which react chemically during film formation to become a constituent of the binder. Reactive diluents for radiation curing may be mono-, di- or polyfunctional free-radically polymerizable monomeric compounds, preferably, having (meth)acryloyl groups. The reactive diluents are of low molecular weight and have, for example, a molar mass of below 500 g/mol.

Examples of monounsaturated reactive diluents include: olefinically unsaturated monocarboxylic acids and esters of olefinically unsaturated monocarboxylic acids with aliphatic, cycloaliphatic or aromatic alcohols. Olefinically unsaturated monocarboxylic acids, which may be considered, are, for example, methacrylic acid, crotonic acid and isocrotonic acid. The alcohols in particular comprise aliphatic, cycloaliphatic or aromatic, monohydric branched or unbranched alcohols having 1-20 carbon atoms per molecule. Examples of (meth)acrylic acid esters with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cycloaliphatic alcohols are cyclohexyl acrylate, trimethylcyclohexyl acrylate, 4-tert.-butylcyclohexyl acrylate, isobornyl acrylate and the corresponding methacrylates. Examples of (meth)acrylates with aromatic alcohols are benzyl (meth)acrylates.

Further examples of monounsaturated reactive diluents are maleic acid and semi-esters thereof, vinyl acetate, vinyl ethers, substituted vinylureas, styrene, vinyltoluene. Examples of diunsaturated reactive diluents include: di(meth)acrylates, such as, alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, hexanediol di(meth)acrylate. Examples of polyunsaturated reactive diluents are: glycerol tri(meth)acrylate, trimethylolpropane tri(meth)acrylate, pentaerythritol tri(meth)acrylate, pentaerythritol tetra(meth)acrylate. The reactive diluents may be used alone or in mixture.

The UV curable coating compositions used in the process according to the invention contain one or more photoinitiators for the radical polymerization (component C). Suitable photoinitiators include, for example, those that absorb in the wavelength range from 190 to 600 nm. The photoinitiators may be present, for example, in quantities of 0.05 to 5 wt-%, preferably, of 0.5 to 3 wt-%, relative to the sum of free-radically polymerizable binders, reactive diluents and photoinitiators. Examples of suitable photoinitiators are benzoin and derivatives thereof, acetophenone and derivatives thereof, for example, 2,2-diacetoxyacetophenone, benzophenone and derivatives thereof, thioxanthone and derivatives thereof, anthraquinone, 1-benzoylcyclohexanol, organophosphorus compounds, such as, acylphosphine oxides. The photoinitiators may be used individually or in combination.

The UV curable coating compositions used in the process according to the invention contain as component D) at least one metal compound selected from the group consisting of metal salt compounds containing the metal in the cation and/or anion of the compound, organometallic compounds, metal coordination compounds and mixtures thereof. Metal salt compounds containing the metal in the cation shall include compounds where the metal itself forms the cation.

The metal is a metal selected from the group consisting of a metal of groups 13-14 of the periodic system of elements and a transition metal, which metal or transition metal is able to occur in at least 2 oxidation states other than zero. Oxidation states other than zero shall mean positive oxidation states.

Transition metal should be taken to mean the elements of groups 3-12 of the periodic system of elements, including the lanthanoides.

Examples of metals and transition metals which may be used are, for example, titanium, vanadium, chromium, manganese, iron, cobalt, nickel, copper, niobium, molybdenum, palladium, tin, tungsten, platinum and the lanthanoids, in particular cerium. Especially preferred are titanium, vanadium, chromium, manganese, iron, cobalt, nickel, copper and cerium.

Preferred components D) are metal salts of an organic and/or inorganic acid.

Examples of organic acids on which the metal salts may be based are unsaturated higher fatty acids, such as, linseed oil fatty acid, tall oil fatty acid, soy oil fatty acid, resin acids (resinol acids), for example, based on diterpenes, such as, abietic, neoabietic, laevopimaric, pimaric and palustrinic acid and agathic acid, illuric acid and podocarpic acid, naphthenic acid, benzoic acid, acetic acid, oxalic acid, sulfonic acid and 2-ethylhexanoic acid and the isomers thereof.

Examples of inorganic acids on which the metal salts may be based are sulfuric acid, phosphoric acid, boric acid, nitric acid and hydrochloric acid.

Substances which may readily be used as component D) and which are also preferred are, for example, the drying agents (or driers) known to the coatings specialist. Drying agents are metal salts of organic acids soluble in organic solvents and binders, which are added to oxidatively curing materials to catalyse the transfer of oxygen from the air (according to DIN 55945). The so-called primary drying agents may here be added alone or in combination with secondary drying agents (drying auxiliaries).

Corresponding cobalt, vanadium, tin, iron, cerium, copper or manganese salts may, for example, preferably be used as primary drying agents. Secondary drying agents, which may be considered, are, for example, the corresponding strontium, calcium zinc or zirconium salts. The drying agents and drying auxiliaries are obtainable as commercial products. Drying agents may, for example, be obtained from the company Borchers under the name Octa-Soligen® for the corresponding octoates (for example, the primary drying agents Octa-Soligen® cobalt and Octa-Soligen® manganese), under the name Soligen® for the corresponding naphthenates and under the name Borchers® VP 0132 for organically modified vanadium compounds. Further drying agents may, for example, be obtained under the name Valirex, for example Valirex Co 6% D60 as cobalt octoate, from the company Corn. Van Loocke N.V. Belgium. It is also possible that commercially available drying agents contain combinations of primary and secondary drying agents, e.g., Octa-Soligen® 173 from Borchers, containing cobalt, zirconium and barium salts of 2-ethylhexanoic acid and its isomers.

The drying agents conventionally assume the form of solutions in organic solvents, for example as a 1-30% solution, but may also be provided in solvent-free form.

Substances which may preferably be used as component D) are cobalt, manganese, vanadium, iron, copper and cerium salts, in particular, the corresponding salts of naphthenic acid, benzoic acid, acetic acid, oxalic acid and 2-ethylhexanoic acid and the isomers thereof. Cobalt octoates, manganese octoates, vanadium octoates, iron octoates and cerium octoates may in particular readily be used as well as cobalt naphtenates, manganese naphtenates, vanadium napthenates, iron naphtenates and cerium naphtenates.

Also mixed metal salts, such as, mixed metal salts of ethylhexanoic acid and naphthenic acid may be used (e.g., ethylhexanoic acid and naphthenic acid in a ratio of 1 mole:1 mole).

The above-stated compounds may advantageously be combined for example with barium, calcium, strontium zinc or zirconium salts (secondary drying agents), for example the corresponding octoates or naphtenates, e.g., Octa-Soligen® Zirkonium and Octa-Soligen® Strontium from Borchers.

Furthermore, organometallic compounds and metal coordination compounds may also in principle be used as component D). Organometallic compounds are compounds having a direct covalent bonding between a metal atom and a carbon atom of an organic group. Examples of organometallic compounds which may be used are disclosed in U.S. Pat. No. 5,212,210.

Examples of metal coordination compounds are metal chelates. Metal chelates are compounds where a single ligand occupies more than one coordination position at the central metal atom. Examples of metal chelates are metal acetyl acetonates, such as, vanadium acetyl acetonate and manganese acetyl acetonate.

It goes without saying that also mixed forms of the above mentioned metal salts, organometallic compounds and metal coordination compounds may be used as component D), e.g., metal coordination compounds in form of a salt having a complex anion and/or cation.

The metal compounds D) may be used individually or in combination.

The UV curable coating compositions used in the process according to the invention contain preferably, 0.05 to 10.0 wt. %, particularly preferably, 1.0 to 3.0 wt. % of the above-stated metal compounds (component D), relative to the complete coating composition. Component D) is preferably used in quantities such that a metal content of $10^{-5}$ to $10^{-1}$ mol of metal per 100 g resin solids of the coating composition is obtained. Particularly preferably, $10^{-4}$ to $5 \times 10^{-2}$ mol of metal per 100 g resin solids are used. The resin solids of the coating composition should here be taken to mean the total of all solids from free-radically polymerizable oligomeric and/or polymeric binders containing olefinically unsaturated groups (component A), from optionally present free-radically polymerizable reactive diluents containing one or more olefinically unsaturated groups (component B) and from further optionally present binder constituents of the coating composition.

Preferably, the UV curable coating compositions used in the process according to the invention contain no beta-diketones and no peroxides.

The UV curable coating compositions may contain, even if not preferred, in addition to the binder components free-radically polymerizable by means of high energy radiation, or in addition to the free-radically polymerizable functional groups, further binder components or further functional groups that are chemically cross-linkable by an additional curing mechanism. Further chemically cross-linking binders that may be used are, for example, those curable by addition and/or condensation reactions of appropriate functional groups.

The olefinic double bonds capable of free-radical polymerization and the functional groups that react together in the manner of addition and/or condensation reactions may be contained, in principle, in the same binder and/or in separate binders.

The functional groups that react together in the manner of addition and/or condensation reactions will be referred to hereinafter as further reactive functional groups. They are reactive functional groups A and reactive functional groups B complementary to the latter. Reactive functional groups A and reactive functional groups B may be present in the same binder and/or in separate binders.

The addition and/or condensation reactions in the above mentioned meaning are cross-linking reactions in coatings chemistry known to the skilled person, such as, ring-opening addition of an epoxide group to a carboxyl group with the formation of an ester group and an hydoxyl group, the addition of an hydroxyl group to an isocyanate group with the formation of a urethane group, the addition of an optionally blocked amino group to an isocyanate group with the formation of a urea group, the reaction of an hydroxyl group with a blocked isocyanate group with the formation of a urethane group and dissociation of the blocking agent, the reaction of an hydroxyl group with an N-methylol group with dissociation of water, the reaction of an hydroxyl group with an N-methylol ether group with dissociation of the etherification alcohol, the transesterification reaction of the hydroxyl group with an ester group with dissociation of the esterification alcohol, the transurethanization reaction of an hydroxyl group with a carbamate group with alcohol dissociation, the reaction of a carbamate group with an N-methylol ether group with dissociation of the etherification alcohol, the addition of an amino group to an epoxy group with ring opening and formation of a secondary hydroxyl group, and the addition reaction of an amino group or of an aceto acetyl group to a group with olefinically unsaturated double bonds, e.g., an acryloyl group.

The UV curable coating compositions used in the process according to the present invention may be pigmented or unpigmented coating compositions. Unpigmented coating compositions are, for example, coating compositions formulated in conventional manner as clear coats. Pigmented coating compositions may contain colour-imparting and/or special effect-imparting pigments. Suitable colour-imparting pigments are any conventional coating pigments of an organic or inorganic nature. Examples of inorganic or organic colour-imparting pigments are titanium dioxide, micronized titanium dioxide, iron oxide pigments, carbon black, azo pigments, phthalocyanine pigments, quinacridone or pyrrolopyrrole pigments. Examples of special effect-imparting pigments are metal pigments, for example, made from aluminum or copper; and interference pigments, such as, metal oxide coated metal pigments and titanium dioxide coated mica. The coating compositions may also contain transparent pigments and/or soluble dyes. Examples of usable fillers are silicon dioxide, aluminium silicate, barium sulfate, calcium carbonate and talc.

The UV curable coating compositions may also contain conventional additives, e.g., conventional coating additives. Examples of conventional coating additives include levelling agents, Theological agents, such as, highly disperse silica or polymeric urea compounds, thickeners, for example, based on partially cross-linked, carboxy-functional polymers or on polyurethanes, defoamers, wetting agents, anticratering agents, catalysts, antioxidants and light stabilizers based on HALS products and/or UV absorbers. The additives are used in conventional amounts known to the person skilled in the art.

The UV curable coating compositions used in the process according to the invention may be waterborne or solvent-based coating compositions. They may contain water and/or organic solvents. In the case of waterborne coating compositions, the binders contained may be ionically or nonionically stabilized in order to achieve sufficient water thinnability. Alternatively or in addition, it is possible to achieve water thinnability by means of external emulsifiers.

The organic solvents that may be contained in the coating compounds according to the invention are conventional paint solvents. These may originate from the preparation of the binders or may be added separately.

The UV curable coating compositions may also be 100%-compositions without any organic solvents and without water.

The application of the UV curable coating composition may proceed in a manner and in a film thickness suitable for the intended purpose, for example, by means of spray application. Application may proceed as a single layer coating or in the context of multilayer coating.

Curing of the coating compositions used in the process according to the invention occurs by radiating with UV radiation. Therefore, in step II, the resultant coating is irradiated with UV radiation.

Source of radiation comprises UV radiation sources emitting UV light in the wave length range from 180 to 420 nm, in particular, from 200 to 400 nm. Examples of such UV radiation sources are optionally doped high, medium and low pressure mercury vapour emitters, gas discharge tubes, such as, low pressure xenon lamps and UV lasers. It is clear for a person skilled in the art that UV radiation sources may in addition emit light in the wave length range of the visible and infrared radiation.

Apart from these continuously operating UV radiation sources, however, it is also possible to use discontinuous UV radiation sources. These are preferably so-called high-energy flash devices (UV flash lamps for short). The UV flash lamps may contain a plurality of flash tubes, for example, quartz tubes filled with inert gas, such as xenon. The UV flash lamps have an illuminance of at least 10 megalux, preferably, from 10 to 80 megalux per flash discharge. The energy per flash discharge may be, for example, 1 to 10 kJoule.

The irradiation time with UV radiation when UV flash lamps are used as the UV radiation source may be, for example, in the range from 1 millisecond to 400 seconds, preferably, from 1 to 160 seconds, depending on the number of flash discharges selected. The flashes may be triggered, for example, about every 1-2 seconds. Curing may take place, for example, by means of 1 to 40 successive flash discharges.

If continuous UV radiation sources are used, the irradiation time may be in the range from a few seconds to about 5 minutes, preferably, less than 5 minutes. The distance between the UV radiation sources and the surface to be irradiated may be, for example, 5 to 60 cm.

In order to cure the coating compositions by means of the additional crosslinking mechanism, the coatings may be left after the irradiation process to cure completely, for example, at room temperature, e.g., for 16-24 hours. It is also possible to carry out full curing at higher temperatures of, for example, 30° C. to 80° C., especially at of 40° C. to 60° C. Complete curing may take place by conventional methods, e.g., in a heated chamber or by means of IR radiation. Depending on the curing temperature, curing times from, e.g., 5 to 60 minutes are possible. Of course, it is also possible to carry out the thermal curing before the irradiation process as well as both before and after the irradiation process.

However, even if there are no further possibilities for chemical crosslinking in addition to the principal crosslinking reaction (free-radical polymerization initiated by UV radiation), it may be advantageous to provide thermal assistance to the UV radiation crosslinking. For example, UV radiation emitters and infrared (IR) radiation emitters may be used in parallel or alternately.

Use of the above-described metal compounds (component D) in UV curing free-radically polymerizable systems results in intervention in the chemical process of inhibition of free-radical polymerization by atmospheric oxygen, whereas in processes known from the prior art the disruptive atmospheric oxygen is prevented from coming into contact with the coating surfaces by incorporating additives into the coating composition or by process control measures, these latter approaches entailing the known disadvantages which have already been stated above. It is believed, that according to the invention the derived products arising during oxygen inhibition are broken back down into free radicals with the assistance of the metal compounds D), said free radicals then being again available to the curing reaction.

Since the UV radiation can damage eyes and skin with inappropriate use, the professional associations specified maximum doses for UV radiation. In the wavelength range of 180-400 nm effective irradiation of 30 J/m2 for a 8 hours working day is permissible for the skin. For the eye it is differentiated between the UV-A range and the shorter-wave UV-B and UV-C ranges. In the wavelength range of 180-315 nm (UV-B: 280-315 nm; UV-C: 180-280 nm) the effective irradiation shall not exceed 30 J/m2 (related to 8 hours working day). For the UV-A range (315-400 nm) effective irradiation of 10 kJ/m2 per day is permissible at a respective irradiation duration smaller than 1000 s (see IRPA: Guidelines on limits of exposure to ultraviolet radiation, Health Physics Vol. 56, No. 6, pp. 971-972, 1989; Vol. 49, No. 8, pp. 331-340, 1985; IRPA=International Radiation Protection Association).

Therefore, when UV technology is used in vehicle repair coating, in particular in a body shop, it is precisely in this sector that it is preferred on occupational safety grounds to use UV radiation sources, which mainly expose UV-A radiation and substantially no UV-C radiation.

On the other hand the inhibiting effect of atmospheric oxygen has a particularly negative impact when UV radiation sources are used which mainly emit UV-A radiation.

Therefore, a preferred variation of the process of the present invention is a process of vehicle repair coating, comprising the following steps:

I) applying a coating composition curable by means of UV radiation onto a vehicle or vehicle part, said vehicle or vehicle part having a blemished area to be repaired on the coated surface, whereas the coating composition comprises
  A) at least one free-radically polymerizable oligomeric and/or polymeric binder containing olefinically unsaturated groups,
  B) optionally, at least one free-radically polymerizable monomeric reactive diluent containing one or more olefinically unsaturated groups,
  C) at least one photoinitiator for free-radical polymerization,
  D) at least one metal compound selected from the group consisting of metal salt compounds containing the metal in the cation and/or anion of the compound, organometallic compounds, metal coordination compounds and mixtures thereof, wherein the metal or metals are selected from a group consisting of a metal from groups 13-14 of the periodic system of elements and a transition metal, which metal or transition metal is able to occur in at least 2 oxidation states other than zero and
  E) optionally water, organic solvents, pigments, fillers and/or conventional coating additives, and
II) irradiating the resultant coating with UV radiation, wherein a UV radiation source is used which substantially emits UV-A radiation.

A UV radiation source which substantially emits UV-A radiation is a UV radiation source which emits UV radiation having a UV-B: UV-A ratio of smaller than 1, preferably having a UVB:UVA ratio of smaller than 0.5, particular preferably having a UV-B:UV-A ratio of smaller than 0.2, and which substantially emits no UV-C radiation.

The required spectral output (UV-B:UV-A ratio, substantially no UV-C radiation) of the UV radiation source can be generated by using a UV radiation lamp directly emitting UV radiation of the required wavelength in the required ratio or by using a usual UV radiation source in combination with appropriate filters. For example, a specified filter can be used to generate UV radiation of a wavelength of 280-440 nm. The spectral output of a given radiation source can be measured with an energy dispersive spectrograph comprising a monochromator and light detector whose sensitivity is known at the relevant wavelengths. The ratio of UVB:UVA can be determined by integrating the intensities of spectral output in the respective wavelength ranges. Appropriate measuring equipment/instruments are commercially available and well known for a person skilled in the field of UV technology.

Suitable UV-A lamps are commercially available. An example for a suitable UV-A lamp is the lamp "UVA hand 250" from Dr. Hönle GmbH.

Even if not preferred, a further embodiment of the present invention is a process for the production of a vehicle repair coating, comprising the following steps:

I) applying a coating composition curable by free-radical polymerization onto a vehicle or vehicle part, said vehicle or vehicle part having a blemished area to be repaired on the coated surface, whereas the coating composition comprises
  A) at least one free-radically polymerizable oligomeric and/or polymeric binder containing olefinically unsaturated groups,
  B) optionally, at least one free-radically polymerizable monomeric reactive diluent containing one or more olefinically unsaturated groups,
  C) at least one photoinitiator for free-radical polymerization,
  D) at least one metal compound selected from the group consisting of metal salt compounds containing the metal in the cation and/or anion of the compound, organometallic compounds, metal coordination compounds and mixtures thereof, wherein the metal or metals are selected from the group consisting of a metal from groups 13-14 of the periodic system of elements and a transition metal, which metal or transition metal is able to occur in at least 2 oxidation states other than zero and
  E) optionally, water, organic solvents, pigments, fillers and/or conventional coating additives, and
II) irradiating the resultant coating with visible light radiation.

Irradiating with visible light radiation can be done by means of a radiation source, which substantially emits radiation in the wavelength range of the visible light (400-750 nm).

In the process for vehicle repair coating of the present invention the UV curable coating compositions described above may, for example, be used as transparent clear coats, pigmented colour- and/or special effect-imparting base coats, pigmented top coats, primer surfacers or primers.

If necessary area on the coated vehicle or vehicle part to be repair coated is prepared in conventional manner. The blemished area may, for example, be prepared by cleaning, sanding, recleaning and applying a putty and/or a primer material. The putty and/or primer material may comprise conventional coating compositions, as are used by the person skilled in the art as putty and primer in vehicle repair coating. The materials used may be solvent-based or water-based. They are cured in conventional manner. The materials used may also be based on the UV curable coating composition described above.

Application of the UV curable coating composition may, however, also be performed on a cured existing or original coating which is still intact.

Therefore, in particular, the invention relates to a process for the production of a multilayer vehicle repair coating to repair a blemished area on the coated surface of an vehicle or vehicle part, comprising the following steps:

I) optionally, preparing the blemished area to be repaired in conventional manner,
II) applying a primer surfacer coat from a primer surfacer coating composition to the optionally prepared area,
III) applying a topcoat layer from a pigmented one-coat finish or a pigmented based coat and a transparent clear coat onto the layer applied in step II), wherein at least one of the coating compositions applied in steps I), II) and III) is a UV curable coating composition, comprising A) at least one free-radically polymerizable oligomeric and/or polymeric binder containing olefinically unsaturated groups,
B) optionally, at least one free-radically polymerizable monomeric reactive diluent containing one or more olefinically unsaturated groups,
C) at least one photoinitiator for free-radical polymerization, at least one metal compound selected from the group consisting of metal salt compounds containing the metal in the cation and/or anion of the compound, organometallic compounds, metal coordination compounds and mixtures thereof, wherein the metal or metals are selected from the group consisting of a metal from groups 13-14 of the periodic system of elements and a transition metal, which metal or transition metal is able to occur in at least 2 oxidation states other than zero and
D) optionally, water, organic solvents, pigments, fillers and/or conventional coating additives, and IV) irradiating the coating obtained from the UV curable coating composition with UV radiation, preferably by means of a UV radiation source which substantially emits UV radiation having a UV-B:UV-A ratio of smaller than 1, preferably having a UV-B:UV-A ratio of smaller than 0.5, particular preferably, having a UV-B:UV-A ratio of smaller than 0.2 and which substantially emits no UV-C radiation.

As stated above at least one of the coating compositions applied in steps I), II) and III) is a UV curable coating composition comprising the above mentioned constituents. Preferably the primer surfacer layer and/or the clear coat layer or the primer surfacer layer and/or the pigmented one-coat finish layer is applied from a UV curable coating composition comprising the above mentioned constituents.

The layers of the multilayer repair coating which are not based on the UV curable coating composition described above may be cured in conventional manner at room temperature or at higher temperatures of, for example, 30° C. to 80° C.

Especially in a vehicle repair paint shop, there is, on the one hand, a requirement to provide adequate quality coatings exhibiting the appropriate technological characteristics, but, on the other hand, measures, such as, working under an inert gas atmosphere are, of course, out of the question and in addition requirements of industrial safety have to be considered. The present invention provides a process of vehicle repair coating, which fulfils these requirements very well. The process yields high quality coatings with good hardness and good solvent resistance and allows the use of UV-A lamps for the curing with UV radiation.

Furthermore, the process of vehicle repair coating of the present invention can be used not only within the scope of a typical vehicle repair coating in a repair body shop, but also within the repair coating of automotive bodies in automotive original coating (end-of-line repair, spot repair), whereas the repair coating of vehicles and vehicle parts shall not be confused with the original coating of vehicle bodies and vehicle parts, e.g., in an automotive plant.

The following Examples are intended to illustrate the invention in greater detail.

EXAMPLES

1. Production of Clear Coats

Clear coats 1 and 2 were produced by vigorously mixing the following components with different components D), while the corresponding comparison clear coats 1 and 2 were produced without component D):

Clear Coat 1

43.77 wt. % of a urethane acrylate (according to example 1a of EP 1 227 895 B1))

10.94 wt. % Ebecryl® 5129 (conventional commercial aliphatic urethane acrylate from UCB)

0.98 wt. % Darocur® 1173 (conventional commercial photoinitiator from CIBA)

0.33 wt. % Irgacur® 819 (conventional commercial photoinitiator from CIBA)

0.11 wt. % Dow Corning® 31 (conventional commercial levelling agent from Dow Corning)

0.55 wt. % Tinuvin® 400 (conventional commercial light stabiliser from CIBA)

41.12 wt. % butyl acetate 98/100

2.19 wt. % Octa Soligen® Fe 7/8 (conventional commercial drying agent based on the iron salts of 2-ethylhexanoic acid and the isomers thereof from Borchers)

Comparison Clear Coat 1

Clear coat 1, but without Octa Soligen® Fe 7/8, was used as comparison clear coat 1.

Clear Coat 2

80.19 wt. % of a urethane acrylate (according to example 1a of EP 1 227 895 B1)

1.36 wt. % Darocur® 1173 (conventional commercial photoinitiator from CIBA)

0.45 wt. % Irgacur® 819 (conventional commercial photoinitiator from CIBA)

0.81 wt. % Byk® 348 (conventional commercial surface additive based on polydimethylsiloxane from Byk)

16.58 wt. % butyl acetate 98/100

0.61 wt. % Octa Soligen 69® (conventional commercial drying agent based on the cobalt and zirconium salts of 2-ethylhexanoic acid and the isomers thereof from Borchers)

Comparison Clear Coat 2

Clear Coat 2, but without Octa Soligen 69,® was used as comparison clear coat 2.

Clear Coats 1 and 2 and comparison clear coats 1 and 2 were applied onto coil coating sheets with a coating knife to a wet film thickness of 75 μm (which corresponded to a dry film thickness of approx. 33 μm).

The coatings were then dried for 5 minutes in a circulating air oven at 80° C. and subsequently irradiated for 60 seconds at a distance from the substrate surface to the radiation source 20 cm with a conventional commercial UV radiation source (Philips HB 404 half body solarium).

Technological Properties of the Coatings Obtained

The cured coatings were tested with regard to pendulum hardness.

|  | Pendulum hardness (1) |
|---|---|
| Clear coat 1 | 117 |
| Comparison clear coat 1 | 95 |
| Clear coat 2 | 75 |
| Comparison clear coat 2 | 69 |

(1) Pendulum hardness was determined by the König method in accordance with DIN EN ISO 1522.

It could be seen that the clear coats according to the invention exhibit greater hardness than the comparison clear coats without drying agents (component D). The greater pendulum hardness may here be considered to be a measure of higher crosslink density and thus improved full curability.

2. Production of Primer Surfacers

Production of a Urethane Acrylate

A mixture of 521 pbw of hexamethylene diisocyanate isocyanurate and 0.9 pbw of methylhydroquinone was initially introduced in a 2 litre glass reactor equipped with a temperature sensor, stirrer and dropping funnel and heated to 60° C. A mixture of 211 pbw of hydroxyethyl acrylate, 67 pbw of n-butanol and 0.1 pbw of dibutyltin dilaurate was added dropwise to said first mixture in such a manner that the temperature did not rise above 80° C. The reaction mixture was then kept at 80° C. until the NCO value was below 0.1%. The mixture was then diluted with 200 pbw of isobornyl acrylate. A colourless, viscous resin with an acryloyl functionality of 2, a solids content (1 h/150° C.) of 79.7% and a viscosity (25° C.) of 22700 mPas was obtained. (pbw: parts by weight)

Primer surfacer 1 was produced by vigorously mixing the following components:

21.2 wt. % of urethane acrylate as prepared above
46.2 wt. % of isobornyl acrylate
0.92 wt. % of Disperbyk 110 (dispersion additive; 53% solution of a copolymer with acidic groups; Byk)
0.01 wt. % of carbon black
0.9 wt. % of titanium dioxide
0.43 wt. % of Aerosil (silica)
7.4 wt. % of kaolin
3.7 wt. % of talcum
12.01 wt. % of barytes
1.85 wt. % of Irgacure 819 (phosphine oxide based photoinitiator; CIBA)
3.7 wt. % of Additol VXL 6219 (acrylic-modified phosphoric acid ester, acid value 320 mg KOH/g; Solutia)
0.92 wt. % Borchers® VP0132 (Vanadium-containing drier from Borchers)
0.46 wt. % Octa Soligen Zvb (conventional commercial drying agent based on zirconium salt, from Borchers)
0.30 wt. % Octa Soligen Sr10 (conventional commercial drying agent based on strontium salt, from Borchers)
wt. %: percent by weight Primer surfacer 1 above but, without the drying agents was used as comparison primer surfacer.

Primer surfacer layers of primer surfacer 1 and comparison primer surfacer were applied by spraying onto bright sheet steel to yield a dry layer thickness of 150 µm. Immediately after application, the primer surfacer layers were exposed to irradiation by a conventional commercial UV radiation source (Philips HB 404, half body solarium) for 5 minutes. The distance between primer surfacer surface and UV radiation source was 10 cm. An object temperature of about 60° C. was reached.

After cooling down the surface of the sheet steel coated with primer surfacer according to the invention was immediately tack-free and properly cured, whereas the surface of the sheet steel coated with the comparison primer surfacer remained tacky even after a long period of time (8 days).

What is claimed is:

1. A process for the production of a vehicle repair coating, comprising the following steps:
    I) applying a coating composition curable by means of UV radiation onto a vehicle or vehicle part, said vehicle or vehicle part having a blemished area to be repaired on the coated surface, whereas the coating composition comprises
        A) at least one free-radically polymerizable oligomeric and/or polymeric binder containing olefinically unsaturated groups,
        B) optionally, at least one free-radically polymerizable monomeric reactive diluent containing one or more olefinically unsaturated groups,
        C) at least one photoinitiator for free-radical polymerization,
        D) at least one metal compound selected from the group consisting of metal salt compounds containing a metal in the cation and/or anion of the compound, organometallic compounds, metal coordination compounds and mixtures thereof, wherein the metal is selected from the group consisting of titanium, vanadium, chromium, manganese, iron, cobalt, nickel, copper, cerium, and a combination thereof, and
        E) optionally, water, organic solvents, pigments, fillers and/or conventional coating additives, and
    II) irradiating the resultant coating with UV radiation.

2. The process according to claim 1, wherein in step II a UV radiation source is used which emits UV radiation having a UV-B:UV-A ratio of smaller than 1.

3. The process according to claim 1, wherein in step II a UV radiation source is used which emits UV radiation having a UV-B:UV-A ratio of smaller than 0.5 and which substantially emits no UV-C radiation.

4. The process according to claim 1, comprising the steps
    I) optionally, preparing the blemished area to be repaired in conventional manner,
    II) applying a primer surfacer coat from a primer surfacer coating composition to the optionally prepared area,
    III) applying a topcoat layer from a pigmented one-coat finish or a pigmented base coat and a transparent clear coat onto the layer applied in step II),
    wherein at least one of the coating compositions applied in steps), II) and III) is a UV curable coating composition, comprising
        A) at least one free-radically polymerizable oligomeric and/or polymeric binder containing olefinically unsaturated groups,
        B) optionally, at least one free-radically polymerizable monomeric reactive diluent containing one or more olefinically unsaturated groups,
        C) at least one photoinitiator for free-radical polymerization, at least one metal compound selected from the group consisting of metal salt compounds containing a metal in the cation and/or anion of the compound, organometallic compounds, metal coordination compounds and mixtures thereof, wherein the metal is selected from the group consisting of titanium, vanadium, chromium, manganese, iron, cobalt, nickel, copper, cerium, and a combination thereof, and D) optionally water, organic solvents, pigments, fillers and/or conventional coating additives, and IV) irradiating the resultant coating with UV radiation.

5. The process according to claim 4, wherein in step II a UV radiation source is used which emits UV radiation having a UV-B:UV-A ratio of smaller than 1.

6. The process according to claim 4, wherein in step ii a UV radiation source is used which emits UV radiation having a UV-B:UV-A ratio of smaller than 0.5 and which substantially emits no UV-C radiation.

7. The process according to claim 1 or 4, wherein the metal compound D) comprises at least one metal salt of an organic and/or inorganic acid.

8. The process according to claim 7, wherein the organic acid is an organic acid selected from the group consisting of unsaturated higher fatty acids, resin acid, naphthenic acid, benzoic acid, acetic acid, sulfonic acid, oxalic acid and 2-ethylhexanoic acid and the isomers thereof and mixtures of these acids.

9. The process according to claim 7, wherein the inorganic acid is an inorganic acid selected from the group consisting of sulfuric acid, phosphoric acid, boric acid, nitric acid and hydrochloric acid.

10. The process according to claim 7, wherein the at least one metal salt of an organic and/or inorganic acid comprises the titanium, vanadium, chromium, manganese, iron, cobalt, nickel, copper, and/or cerium salt of naphthenic acid, benzoic acid, acetic acid, oxalic acid and/or 2-ethylhexanoic acid and the isomers thereof.

11. The process according to claim 1 or 4, wherein the metal compounds D) comprise those selected from the group consisting of cobalt octoates, manganese octoates, vanadium octoates, iron octoates, cerium octoates, cobalt naphtenates, manganese naphtenates, vanadium naphtenates, iron naphtenates, cerium naphtenates and mixtures thereof.

12. The process according to claim 1 or 4, wherein component D) is present in the coating composition in a quantity such that a metal content of $10^{-5}$ to $10^{-1}$ mol of metal per 100 g of resin solids of the coating composition is obtained.

13. The process according to claim 1 or 4, wherein component D)is present in the coating composition in a quantity such that a metal content of $10^{-4}$ to $5\times10^{-2}$ mol of metal per 100 g of resin solids of the coating composition is obtained.

14. The process according to claim 1 or 4, wherein component A) comprises (meth)acryloyl-functional poly(meth)acrylates, polyurethane (meth)acrylates, polyester (meth)acrylates, unsaturated polyesters, polyether (meth)acrylates, silicone (meth)acrylates, epoxy (meth)acrylates and melamine (meth)acrylates.

15. The process according to claim 1 or 4, wherein the olefinically unsaturated groups of component A) and component B) are (meth)acryloyl groups.

16. A process for the production of a vehicle repair coating, comprising the following steps:

I) applying a coating composition curable by free-radical polymerization onto a vehicle or vehicle part, said vehicle or vehicle part having a blemished area to be repaired on the coated surface, whereas the coating composition comprises A) at least one free-radically polymerizable oligomeric and/or polymeric binder containing olefinically unsaturated groups, B) optionally, at least one free-radically polymerizable monomeric reactive diluent containing one or more olefinically unsaturated groups, C) at least one photoinitiator for free-radical polymerization, D) at least one metal compound selected from the group consisting of metal salt compounds containing a metal in the cation and/or anion of the compound, organometallic compounds, metal coordination compounds and mixtures thereof, wherein the metal is selected from the group consisting of titanium, vanadium, chromium, manganese, iron, cobalt, nickel, copper, cerium, and a combination thereof, and E) optionally, water, organic solvents, pigments, fillers and/or conventional coating additives, and II) irradiating the resultant coating with visible light radiation.

* * * * *